US011853919B1

(12) United States Patent
Mangat et al.

(10) Patent No.: US 11,853,919 B1
(45) Date of Patent: Dec. 26, 2023

(54) SYSTEMS AND METHODS FOR PEER-TO-PEER FUNDS REQUESTS

(71) Applicant: Wells Fargo Bank, N.A., San Francisco, CA (US)

(72) Inventors: Balinder Mangat, Castro Valley, CA (US); David Hatch, Daly City, CA (US); Uma Meyyappan, Fremont, CA (US); Bipin Sahni, Pleasanton, CA (US); Nikolai Stroke, Gilbert, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 158 days.

(21) Appl. No.: 14/637,603

(22) Filed: Mar. 4, 2015

(51) Int. Cl.
*G06Q 20/10* (2012.01)
*G06Q 20/22* (2012.01)
*G06Q 20/20* (2012.01)

(52) U.S. Cl.
CPC .......... *G06Q 20/10* (2013.01); *G06Q 20/202* (2013.01); *G06Q 20/223* (2013.01)

(58) Field of Classification Search
CPC ........ G06Q 20/40; G06Q 20/10; G06Q 20/36; G06Q 20/105; G06Q 20/349; G06Q 20/351; G06Q 40/02; G06Q 20/023; G06Q 20/027; G06Q 20/20; G06Q 20/204; G06Q 20/322; G06Q 20/065; G06Q 20/102; G06Q 20/12; G06Q 20/325; G06Q 20/3255; G06Q 20/3829; G06Q 20/405; G06Q 30/06; G06Q 20/223; G06Q 20/227; G06Q 20/26; G06Q 20/32; G06Q 20/3223; G06Q 30/0635; G06Q 20/202; G06C 20/351; G06C 40/02; G06C 20/023; G06C 20/027; G06C 20/20;
(Continued)

(56) References Cited

U.S. PATENT DOCUMENTS 5,412,192 A 5/1995 Hoss
5,778,067 A 7/1998 Jones et al.
(Continued)

FOREIGN PATENT DOCUMENTS

WO WO-2011/113121 A1 9/2011
WO WO-2012/139003 A2 10/2012
(Continued)

OTHER PUBLICATIONS

Office Action on U.S. Appl. No. 14/266,580, dated Apr. 9, 2015, 16 pages.
(Continued)

*Primary Examiner* — Slade E Smith
(74) *Attorney, Agent, or Firm* — Foley & Lardner LLP

(57) ABSTRACT

A mobile wallet system to users is described. The mobile wallet system allows users to provide payments to merchants via the mobile wallet system. Users' mobile wallets are linked to payment forms associated with the users (e.g., bank accounts, credit cards, gift cards, etc.). Additionally, the mobile wallet system allows a first user to request funding from or provide funding to a second user for certain transactions. To pay for a good or service provided by a merchant, a user selects a form of payment, which may be another user, and provides a code to the merchant, which is used by a merchant computing system to initiate payment from the user to the merchant via the financial institution computing system.

15 Claims, 6 Drawing Sheets

(58) Field of Classification Search
CPC .. G06C 20/204; G06C 20/322; G06C 20/065; G06C 20/102; G06C 20/12; G06C 20/223; G06C 20/227; G06C 20/26; G06C 20/32; G06C 20/3223; G06C 20/325; G06C 20/3255; G06C 20/3829; G06C 20/405; G06C 30/06; G06C 30/0635; G06C 20/10; G07G 1/0081; H04M 3/16; H04W 4/00
USPC .......................................................... 705/44
See application file for complete search history.

(56) References Cited

U.S. PATENT DOCUMENTS

| | | | |
|---|---|---|---|
| 6,016,484 | A | 1/2000 | Williams et al. |
| 6,018,724 | A | 1/2000 | Arent |
| 6,615,194 | B1 | 9/2003 | Deutsch et al. |
| 6,865,547 | B1 | 3/2005 | Brake et al. |
| 6,873,974 | B1 | 3/2005 | Schutzer |
| 7,765,481 | B2 | 7/2010 | Dixon et al. |
| 7,822,206 | B2 | 10/2010 | Birk et al. |
| 7,827,057 | B1 | 11/2010 | Walker et al. |
| 7,909,243 | B2 * | 3/2011 | Merkow ............ G06Q 20/3274 235/379 |
| 7,930,225 | B2 | 4/2011 | Wahlberg et al. |
| 7,945,776 | B1 | 5/2011 | Atzmony et al. |
| 7,970,669 | B1 | 6/2011 | Santos |
| 8,019,365 | B2 | 9/2011 | Fisher |
| 8,078,140 | B2 | 12/2011 | Baker et al. |
| 8,126,806 | B1 | 2/2012 | Dimartino et al. |
| 8,160,959 | B2 | 4/2012 | Rackley et al. |
| 8,215,560 | B2 | 7/2012 | Granucci et al. |
| 8,280,788 | B2 | 10/2012 | Perlman |
| 8,332,290 | B1 | 12/2012 | Venturo et al. |
| 8,401,904 | B1 | 3/2013 | Simakov et al. |
| 8,433,657 | B2 | 4/2013 | Dinan |
| 8,452,257 | B2 | 5/2013 | Granucci et al. |
| 8,467,766 | B2 | 6/2013 | Rackley et al. |
| 8,468,587 | B2 | 6/2013 | Blinn et al. |
| 8,489,067 | B2 | 7/2013 | Rackley, III et al. |
| 8,504,699 | B2 | 8/2013 | Vaughan et al. |
| 8,533,123 | B2 | 9/2013 | Hart |
| 8,538,845 | B2 | 9/2013 | Liberty |
| 8,548,908 | B2 | 10/2013 | Friedman |
| 8,548,926 | B2 | 10/2013 | Balistierri et al. |
| 8,555,361 | B2 | 10/2013 | Nakhjiri et al. |
| 8,566,237 | B2 | 10/2013 | Forzley |
| 8,566,239 | B2 | 10/2013 | Arthur et al. |
| 8,577,803 | B2 | 11/2013 | Chatterjee et al. |
| 8,615,468 | B2 | 12/2013 | Varadarajan |
| 8,627,424 | B1 | 1/2014 | O'Malley et al. |
| 8,639,621 | B1 * | 1/2014 | Ellis ................. G06Q 30/0267 705/41 |
| 8,645,971 | B2 | 2/2014 | Carlson et al. |
| 8,676,704 | B2 | 3/2014 | Ledbetter et al. |
| 8,700,729 | B2 | 4/2014 | Dua |
| 8,706,628 | B2 | 4/2014 | Phillips |
| 8,725,576 | B2 | 5/2014 | Fisher |
| 8,725,577 | B2 | 5/2014 | Fisher |
| 8,732,080 | B2 | 5/2014 | Karim |
| 8,744,966 | B1 | 6/2014 | Amacker et al. |
| 8,750,901 | B1 * | 6/2014 | Gupta .................. G06Q 20/42 455/456.3 |
| 8,768,830 | B1 | 7/2014 | Jorgensen et al. |
| 8,768,834 | B2 | 7/2014 | Zacarias et al. |
| 8,774,781 | B1 | 7/2014 | Speiser et al. |
| 8,781,955 | B2 | 7/2014 | Schamer et al. |
| 8,831,677 | B2 | 9/2014 | Villa-Real |
| 8,838,501 | B1 * | 9/2014 | Priebatsch ............ G06Q 20/12 705/64 |
| 8,843,125 | B2 | 9/2014 | Kwon et al. |
| 8,843,417 | B2 | 9/2014 | Hammad |
| 8,880,432 | B2 | 11/2014 | Collins, Jr. |
| 8,924,246 | B1 * | 12/2014 | Chen .................... G06Q 20/40 705/26.82 |
| 8,925,805 | B2 | 1/2015 | Grigg et al. |
| 8,930,271 | B1 | 1/2015 | Ellis et al. |
| 8,972,297 | B2 | 3/2015 | Kay et al. |
| 8,977,251 | B2 | 3/2015 | Grigg et al. |
| 8,989,712 | B2 | 3/2015 | Wentker et al. |
| 9,020,836 | B2 | 4/2015 | Fisher et al. |
| 9,026,460 | B2 | 5/2015 | Grigg et al. |
| 9,027,109 | B2 | 5/2015 | Wolberg-Stok et al. |
| 9,037,509 | B1 | 5/2015 | Ellis et al. |
| 9,043,240 | B2 | 5/2015 | Langus et al. |
| 9,098,190 | B2 | 8/2015 | Zhou et al. |
| 9,117,242 | B1 | 8/2015 | Ellis et al. |
| 9,177,307 | B2 | 11/2015 | Ross et al. |
| 9,195,984 | B1 | 11/2015 | Spector et al. |
| 9,208,488 | B2 | 12/2015 | Liberty |
| 9,218,624 | B2 | 12/2015 | Moghadam |
| 9,256,876 | B2 | 2/2016 | Vasant Akole et al. |
| 9,286,606 | B2 | 3/2016 | Diamond |
| 9,317,849 | B2 | 4/2016 | Pitroda et al. |
| 9,324,068 | B2 | 4/2016 | Soundararajan |
| 9,361,616 | B2 | 6/2016 | Zhou et al. |
| 9,652,770 | B1 | 5/2017 | Kurani et al. |
| 9,659,312 | B1 | 5/2017 | Ellis et al. |
| 9,691,058 | B2 * | 6/2017 | Epler ..................... G06Q 20/10 |
| 9,704,157 | B1 | 7/2017 | Ellis et al. |
| 9,741,051 | B2 * | 8/2017 | Carpenter .............. G06Q 20/02 |
| 9,805,363 | B1 | 10/2017 | Rudnick et al. |
| 9,928,518 | B1 | 3/2018 | Vippagunta et al. |
| 9,972,047 | B1 | 5/2018 | Elliott |
| 10,121,129 | B2 | 11/2018 | Kalgi |
| 10,140,615 | B2 | 11/2018 | Carpenter et al. |
| 10,169,812 | B1 | 1/2019 | Bajgier et al. |
| 10,235,668 | B1 | 3/2019 | Ellis et al. |
| 10,242,368 | B1 | 3/2019 | Poole |
| 10,380,583 | B1 | 8/2019 | Ellis et al. |
| 10,380,596 | B1 | 8/2019 | Butler et al. |
| 10,402,897 | B1 | 9/2019 | Czyzewski et al. |
| 10,445,739 | B1 | 10/2019 | Sahni et al. |
| 10,515,356 | B2 | 12/2019 | Cronic et al. |
| 10,997,592 | B1 | 5/2021 | Kurani |
| 11,288,660 | B1 | 3/2022 | Kurani |
| 11,436,581 | B1 | 9/2022 | Walker et al. |
| 2002/0032602 | A1 * | 3/2002 | Lanzillo, Jr. ........... G06Q 30/02 705/14.66 |
| 2002/0052852 | A1 | 5/2002 | Bozeman |
| 2002/0062249 | A1 | 5/2002 | Iannacci |
| 2003/0028481 | A1 | 2/2003 | Flitcroft et al. |
| 2003/0040964 | A1 | 2/2003 | Lacek |
| 2003/0055785 | A1 | 3/2003 | Lahiri |
| 2003/0056096 | A1 | 3/2003 | Albert et al. |
| 2004/0230535 | A1 * | 11/2004 | Binder .................... G06Q 20/24 705/64 |
| 2004/0236632 | A1 | 11/2004 | Maritzen et al. |
| 2004/0254848 | A1 | 12/2004 | Golan et al. |
| 2004/0260646 | A1 | 12/2004 | Berardi et al. |
| 2005/0021401 | A1 | 1/2005 | Postrel |
| 2005/0043997 | A1 | 2/2005 | Sahota et al. |
| 2005/0077350 | A1 | 4/2005 | Courtion et al. |
| 2005/0086492 | A1 | 4/2005 | Nicodemus et al. |
| 2005/0125317 | A1 | 6/2005 | Winkelman et al. |
| 2005/0138377 | A1 | 6/2005 | First et al. |
| 2005/0184145 | A1 | 8/2005 | Law et al. |
| 2005/0235363 | A1 | 10/2005 | Hibbard et al. |
| 2006/0235795 | A1 | 10/2006 | Johnson et al. |
| 2006/0253335 | A1 | 11/2006 | Keena et al. |
| 2007/0168354 | A1 | 7/2007 | Ramer et al. |
| 2007/0170243 | A1 | 7/2007 | Desany et al. |
| 2007/0174873 | A1 | 7/2007 | Griggs |
| 2007/0198432 | A1 | 8/2007 | Pitroda |
| 2007/0244811 | A1 | 10/2007 | Tumminaro |
| 2008/0005006 | A1 | 1/2008 | Tritt et al. |
| 2008/0006685 | A1 | 1/2008 | Rackley, III et al. |
| 2008/0033878 | A1 | 2/2008 | Krikorian et al. |
| 2008/0040265 | A1 | 2/2008 | Rackley III et al. |
| 2008/0127317 | A1 | 5/2008 | Nakhjiri |
| 2008/0203152 | A1 | 8/2008 | Hammad et al. |
| 2008/0208742 | A1 | 8/2008 | Arthur |
| 2008/0242274 | A1 | 10/2008 | Swanburg et al. |
| 2008/0243701 | A1 | 10/2008 | Von Mueller |

(56) References Cited

U.S. PATENT DOCUMENTS

| | | |
|---|---|---|
| 2008/0294556 A1 | 11/2008 | Anderson |
| 2008/0319887 A1 | 12/2008 | Pizzi et al. |
| 2009/0027191 A1 | 1/2009 | Farah et al. |
| 2009/0048971 A1 | 2/2009 | Hathaway et al. |
| 2009/0106558 A1 | 4/2009 | Delgrosso et al. |
| 2009/0157531 A1 | 6/2009 | Bui |
| 2009/0177563 A1* | 7/2009 | Bernstein ............... G06Q 20/04 705/30 |
| 2009/0228384 A1 | 9/2009 | Melik-Aslanian et al. |
| 2009/0228966 A1 | 9/2009 | Parfene et al. |
| 2009/0271287 A1 | 10/2009 | Halpern |
| 2009/0319427 A1 | 12/2009 | Gardner et al. |
| 2010/0082481 A1 | 4/2010 | Lin et al. |
| 2010/0114724 A1 | 5/2010 | Ghosh et al. |
| 2010/0114731 A1 | 5/2010 | Kingston et al. |
| 2010/0114733 A1 | 5/2010 | Collas et al. |
| 2010/0125495 A1 | 5/2010 | Smith et al. |
| 2010/0131415 A1 | 5/2010 | Sartipi |
| 2010/0191602 A1 | 7/2010 | Mikkelsen et al. |
| 2010/0205077 A1 | 8/2010 | Hammad |
| 2011/0055080 A1* | 3/2011 | Ahlers ............... G06Q 40/02 705/40 |
| 2011/0106674 A1* | 5/2011 | Perlman ............... G06Q 20/40 705/30 |
| 2011/0145149 A1 | 6/2011 | Valdes et al. |
| 2011/0153397 A1 | 6/2011 | Wagenheim |
| 2011/0153498 A1 | 6/2011 | Makhotin et al. |
| 2011/0154466 A1 | 6/2011 | Harper et al. |
| 2011/0191160 A1 | 8/2011 | Blackhurst et al. |
| 2011/0196782 A1 | 8/2011 | Allen et al. |
| 2011/0251892 A1 | 10/2011 | Laracey |
| 2011/0270665 A1 | 11/2011 | Kim et al. |
| 2011/0270748 A1* | 11/2011 | Graham, III ............ G06Q 40/00 705/40 |
| 2011/0289004 A1 | 11/2011 | Prakash et al. |
| 2011/0295748 A1 | 12/2011 | Woodriffe |
| 2011/0302084 A1 | 12/2011 | Melik-Aslanian et al. |
| 2011/0313918 A1 | 12/2011 | Lawson et al. |
| 2012/0011063 A1* | 1/2012 | Killian ............... G06Q 20/349 705/41 |
| 2012/0018511 A1 | 1/2012 | Hammad |
| 2012/0022944 A1 | 1/2012 | Volpi |
| 2012/0078735 A1 | 3/2012 | Bauer et al. |
| 2012/0078751 A1* | 3/2012 | MacPhail ............... G06Q 20/06 705/26.41 |
| 2012/0084210 A1 | 4/2012 | Farahmand |
| 2012/0110634 A1 | 5/2012 | Jakobsson et al. |
| 2012/0130731 A1 | 5/2012 | Canetto |
| 2012/0143705 A1 | 6/2012 | Bhattacharya et al. |
| 2012/0150669 A1 | 6/2012 | Langley et al. |
| 2012/0150687 A1 | 6/2012 | Hart |
| 2012/0158589 A1* | 6/2012 | Katzin ............... G06Q 20/384 705/44 |
| 2012/0185317 A1* | 7/2012 | Wong ............... G06Q 30/0222 705/14.23 |
| 2012/0185387 A1 | 7/2012 | Doyle |
| 2012/0192254 A1 | 7/2012 | Garcia Perez et al. |
| 2012/0196586 A1 | 8/2012 | Grigg et al. |
| 2012/0197793 A1 | 8/2012 | Grigg et al. |
| 2012/0197794 A1 | 8/2012 | Grigg et al. |
| 2012/0209749 A1* | 8/2012 | Hammad ............... G06Q 20/20 705/27.1 |
| 2012/0239417 A1* | 9/2012 | Pourfallah ......... G06Q 30/0601 705/2 |
| 2012/0253852 A1* | 10/2012 | Pourfallah ........... G06Q 20/405 705/4 |
| 2012/0254021 A1* | 10/2012 | Wohied ............... G06Q 20/405 705/39 |
| 2012/0271705 A1 | 10/2012 | Postrel |
| 2012/0271712 A1 | 10/2012 | Katzin et al. |
| 2012/0284130 A1* | 11/2012 | Lewis ............... G06Q 20/00 705/16 |
| 2012/0284195 A1 | 11/2012 | McMillen et al. |
| 2012/0290376 A1 | 11/2012 | Dryer et al. |
| 2012/0296720 A1 | 11/2012 | Pirillo |
| 2012/0303425 A1* | 11/2012 | Katzin ............... G06Q 20/12 705/14.4 |
| 2012/0310774 A1 | 12/2012 | Chassin |
| 2012/0323762 A1 | 12/2012 | Kapur et al. |
| 2012/0330837 A1 | 12/2012 | Persaud et al. |
| 2013/0006848 A1* | 1/2013 | Kuttuva ............. G06Q 20/3276 705/39 |
| 2013/0013499 A1 | 1/2013 | Kalgi |
| 2013/0018777 A1* | 1/2013 | Klein ............... G06Q 50/01 705/38 |
| 2013/0018792 A1 | 1/2013 | Casey et al. |
| 2013/0030941 A1 | 1/2013 | Meredith et al. |
| 2013/0042261 A1 | 2/2013 | Tavormina et al. |
| 2013/0046697 A1 | 2/2013 | Schibuk |
| 2013/0054454 A1 | 2/2013 | Purves et al. |
| 2013/0060679 A1* | 3/2013 | Oskolkov ............ G06Q 20/223 705/39 |
| 2013/0060696 A1 | 3/2013 | Martin et al. |
| 2013/0060708 A1 | 3/2013 | Oskolkov et al. |
| 2013/0065555 A1 | 3/2013 | Baker et al. |
| 2013/0073365 A1* | 3/2013 | McCarthy ............. G06Q 20/12 705/14.23 |
| 2013/0073459 A1* | 3/2013 | Zacarias ............... G06Q 20/36 705/41 |
| 2013/0080241 A1 | 3/2013 | Fisher |
| 2013/0110628 A1 | 5/2013 | Yeo et al. |
| 2013/0110658 A1 | 5/2013 | Lyman et al. |
| 2013/0132854 A1 | 5/2013 | Raleigh et al. |
| 2013/0144663 A1 | 6/2013 | Qawami et al. |
| 2013/0144702 A1 | 6/2013 | Tabor et al. |
| 2013/0151400 A1 | 6/2013 | Makhotin et al. |
| 2013/0166332 A1* | 6/2013 | Hammad ............... G06Q 20/12 705/5 |
| 2013/0173474 A1 | 7/2013 | Ranganathan et al. |
| 2013/0179352 A1 | 7/2013 | Dwyre et al. |
| 2013/0185167 A1* | 7/2013 | Mestre ................. G06Q 20/202 705/21 |
| 2013/0191227 A1 | 7/2013 | Pasa et al. |
| 2013/0191277 A1 | 7/2013 | O'Leary et al. |
| 2013/0191278 A1 | 7/2013 | O'Leary et al. |
| 2013/0200999 A1 | 8/2013 | Spodak et al. |
| 2013/0204785 A1 | 8/2013 | Monk et al. |
| 2013/0226720 A1 | 8/2013 | Ahluwalia et al. |
| 2013/0226751 A1 | 8/2013 | Friedholm et al. |
| 2013/0226799 A1 | 8/2013 | Raj |
| 2013/0232032 A1 | 9/2013 | Chaturvedi et al. |
| 2013/0238455 A1 | 9/2013 | Laracey |
| 2013/0246260 A1 | 9/2013 | Barten et al. |
| 2013/0246261 A1 | 9/2013 | Purves et al. |
| 2013/0246265 A1 | 9/2013 | Al-Sahli et al. |
| 2013/0254102 A1 | 9/2013 | Royyuru |
| 2013/0254114 A1 | 9/2013 | Smith |
| 2013/0254115 A1 | 9/2013 | Pasa et al. |
| 2013/0260734 A1 | 10/2013 | Jain et al. |
| 2013/0262309 A1* | 10/2013 | Gadotti ............... G06Q 20/322 705/44 |
| 2013/0262316 A1 | 10/2013 | Hruska |
| 2013/0282588 A1 | 10/2013 | Hruska |
| 2013/0290121 A1 | 10/2013 | Simakov et al. |
| 2013/0290169 A1 | 10/2013 | Bathula et al. |
| 2013/0304559 A1 | 11/2013 | Stone et al. |
| 2013/0304642 A1 | 11/2013 | Campos |
| 2013/0317928 A1 | 11/2013 | Laracey |
| 2013/0317984 A1 | 11/2013 | O'Leary et al. |
| 2013/0332344 A1 | 12/2013 | Weber |
| 2013/0332353 A1 | 12/2013 | Aidasani et al. |
| 2013/0346302 A1 | 12/2013 | Purves et al. |
| 2014/0006129 A1 | 1/2014 | Heath |
| 2014/0006276 A1 | 1/2014 | Grigg et al. |
| 2014/0012750 A1 | 1/2014 | Kuhn et al. |
| 2014/0019352 A1* | 1/2014 | Shrivastava ......... G06Q 20/326 705/41 |
| 2014/0019360 A1 | 1/2014 | Yang |
| 2014/0038546 A1 | 2/2014 | Neal et al. |
| 2014/0058855 A1* | 2/2014 | Hussein ............... G06Q 20/32 705/16 |
| 2014/0058936 A1 | 2/2014 | Ren et al. |

(56) References Cited

U.S. PATENT DOCUMENTS

| | | |
|---|---|---|
| 2014/0067677 A1 | 3/2014 | Ali et al. |
| 2014/0074581 A1 | 3/2014 | Johnson et al. |
| 2014/0074637 A1 | 3/2014 | Hammad |
| 2014/0074655 A1 | 3/2014 | Lim et al. |
| 2014/0074724 A1* | 3/2014 | Gordon .............. G06Q 20/023 705/71 |
| 2014/0081783 A1* | 3/2014 | Paranjape ............ G06Q 20/40 705/21 |
| 2014/0081854 A1 | 3/2014 | Sanchez et al. |
| 2014/0089171 A1* | 3/2014 | Gandhi ............ G06Q 30/0601 705/39 |
| 2014/0096215 A1 | 4/2014 | Hessler |
| 2014/0100975 A1 | 4/2014 | Van |
| 2014/0101048 A1 | 4/2014 | Gardiner et al. |
| 2014/0108254 A1* | 4/2014 | Lee .................. G06Q 20/3224 705/44 |
| 2014/0108263 A1 | 4/2014 | Ortiz et al. |
| 2014/0109200 A1 | 4/2014 | Tootill et al. |
| 2014/0114856 A1 | 4/2014 | Jung et al. |
| 2014/0118704 A1 | 5/2014 | Duelli et al. |
| 2014/0122310 A1 | 5/2014 | Torrens et al. |
| 2014/0122563 A1 | 5/2014 | Singh et al. |
| 2014/0129357 A1 | 5/2014 | Goodwin |
| 2014/0129442 A1 | 5/2014 | Hanson et al. |
| 2014/0136352 A1* | 5/2014 | Ramakrishna ....... G06Q 20/384 705/21 |
| 2014/0143089 A1 | 5/2014 | Campos et al. |
| 2014/0180849 A1 | 6/2014 | Kimberg et al. |
| 2014/0188704 A1 | 7/2014 | Grossman et al. |
| 2014/0188718 A1 | 7/2014 | Grossman et al. |
| 2014/0188719 A1 | 7/2014 | Poornachandran et al. |
| 2014/0207680 A1 | 7/2014 | Rephlo |
| 2014/0214640 A1 | 7/2014 | Mallikarjunan et al. |
| 2014/0222670 A1 | 8/2014 | Concannon |
| 2014/0244506 A1 | 8/2014 | Gramling |
| 2014/0249948 A1 | 9/2014 | Graylin et al. |
| 2014/0250003 A1 | 9/2014 | Levchin et al. |
| 2014/0258135 A1 | 9/2014 | Park et al. |
| 2014/0279097 A1* | 9/2014 | Alshobaki ............ G06Q 20/10 705/16 |
| 2014/0279469 A1 | 9/2014 | Mendes |
| 2014/0279489 A1 | 9/2014 | Russell et al. |
| 2014/0279504 A1* | 9/2014 | Cook ................ G06Q 20/3224 705/44 |
| 2014/0279566 A1 | 9/2014 | Verma et al. |
| 2014/0282068 A1 | 9/2014 | Levkovitz et al. |
| 2014/0297435 A1 | 10/2014 | Wong |
| 2014/0297520 A1 | 10/2014 | Levchin et al. |
| 2014/0297524 A1 | 10/2014 | Ravindranath et al. |
| 2014/0304095 A1 | 10/2014 | Fisher |
| 2014/0310173 A1 | 10/2014 | Caldwell |
| 2014/0310182 A1 | 10/2014 | Cummins |
| 2014/0337175 A1* | 11/2014 | Katzin ............... G06Q 30/0623 705/26.62 |
| 2014/0337621 A1 | 11/2014 | Nakhimov |
| 2014/0344153 A1 | 11/2014 | Raj et al. |
| 2014/0347265 A1 | 11/2014 | Aimone et al. |
| 2014/0351072 A1* | 11/2014 | Wieler ............... G06Q 20/405 705/21 |
| 2014/0351126 A1* | 11/2014 | Priebatsch ............ G06Q 20/40 705/44 |
| 2014/0351130 A1* | 11/2014 | Cheek .................. G06Q 20/29 705/44 |
| 2014/0365363 A1 | 12/2014 | Knudsen et al. |
| 2014/0376576 A1 | 12/2014 | Jespersen et al. |
| 2014/0379576 A1* | 12/2014 | Marx ................ G06Q 20/2295 705/44 |
| 2015/0019944 A1 | 1/2015 | Kalgi |
| 2015/0026049 A1 | 1/2015 | Theurer et al. |
| 2015/0032626 A1 | 1/2015 | Dill et al. |
| 2015/0032627 A1 | 1/2015 | Dill et al. |
| 2015/0035643 A1 | 2/2015 | Kursun |
| 2015/0039462 A1 | 2/2015 | Shastry et al. |
| 2015/0046241 A1 | 2/2015 | Salmon et al. |
| 2015/0046339 A1 | 2/2015 | Wong et al. |
| 2015/0074774 A1 | 3/2015 | Nema et al. |
| 2015/0088633 A1 | 3/2015 | Salmon et al. |
| 2015/0089568 A1 | 3/2015 | Sprague et al. |
| 2015/0095075 A1 | 4/2015 | Breuer et al. |
| 2015/0095219 A1 | 4/2015 | Hurley |
| 2015/0100442 A1 | 4/2015 | Van Heerden et al. |
| 2015/0112781 A1* | 4/2015 | Clark ................. G06Q 30/0215 705/14.17 |
| 2015/0140960 A1 | 5/2015 | Powell et al. |
| 2015/0154588 A1* | 6/2015 | Purves .............. G06Q 30/0226 705/14.27 |
| 2015/0178693 A1* | 6/2015 | Solis .................... G06Q 20/027 705/30 |
| 2015/0178725 A1 | 6/2015 | Poetsch |
| 2015/0186872 A1 | 7/2015 | Sobol et al. |
| 2015/0186875 A1 | 7/2015 | Zhang et al. |
| 2015/0186886 A1 | 7/2015 | Schwalb et al. |
| 2015/0186952 A1 | 7/2015 | Brown et al. |
| 2015/0187021 A1 | 7/2015 | Moring et al. |
| 2015/0193869 A1 | 7/2015 | Del Vecchio et al. |
| 2015/0220914 A1 | 8/2015 | Purves et al. |
| 2015/0229622 A1 | 8/2015 | Grigg et al. |
| 2015/0254698 A1 | 9/2015 | Bondesen et al. |
| 2015/0254699 A1* | 9/2015 | Bondesen ........... G06Q 20/385 705/14.17 |
| 2015/0278799 A1 | 10/2015 | Palanisamy |
| 2015/0287015 A1 | 10/2015 | Kaplinger et al. |
| 2015/0287037 A1 | 10/2015 | Salmon et al. |
| 2015/0319158 A1 | 11/2015 | Kumnick |
| 2015/0324768 A1* | 11/2015 | Filter ................. G06Q 20/0655 705/38 |
| 2015/0332252 A1 | 11/2015 | Shahrokhi et al. |
| 2015/0339662 A1 | 11/2015 | Huang et al. |
| 2015/0371234 A1 | 12/2015 | Huang et al. |
| 2015/0371326 A1 | 12/2015 | Montesano et al. |
| 2016/0004876 A1 | 1/2016 | Bye et al. |
| 2016/0012465 A1* | 1/2016 | Sharp .................. G06Q 20/386 705/14.17 |
| 2016/0026999 A1 | 1/2016 | Kurian |
| 2016/0042341 A1 | 2/2016 | Griffin et al. |
| 2016/0042344 A1 | 2/2016 | Thimmana et al. |
| 2016/0048828 A1 | 2/2016 | Lee |
| 2016/0063496 A1 | 3/2016 | Royyuru et al. |
| 2016/0065370 A1 | 3/2016 | Le Saint et al. |
| 2016/0086170 A1 | 3/2016 | Hurt et al. |
| 2016/0086179 A1 | 3/2016 | Barbier |
| 2016/0092696 A1 | 3/2016 | Guglani et al. |
| 2016/0092866 A1 | 3/2016 | Liberty et al. |
| 2016/0092868 A1 | 3/2016 | Salama et al. |
| 2016/0092874 A1 | 3/2016 | O'Regan et al. |
| 2016/0125396 A1 | 5/2016 | Brickell et al. |
| 2016/0125409 A1 | 5/2016 | Meredith et al. |
| 2016/0125417 A1 | 5/2016 | Huang et al. |
| 2016/0132875 A1* | 5/2016 | Blanco ................ G06Q 20/047 705/44 |
| 2016/0140555 A1* | 5/2016 | Scipioni ............. G06Q 20/381 705/43 |
| 2016/0162889 A1 | 6/2016 | Badenhorst |
| 2016/0342962 A1 | 11/2016 | Brown et al. |
| 2016/0342992 A1 | 11/2016 | Lee |
| 2016/0379215 A1 | 12/2016 | Clerkin |
| 2017/0017958 A1* | 1/2017 | Scott .................... G06Q 20/12 |
| 2017/0061402 A1 | 3/2017 | Mobin et al. |
| 2017/0061406 A1 | 3/2017 | Adams et al. |
| 2017/0164139 A1 | 6/2017 | Deselaers et al. |
| 2017/0193468 A1 | 7/2017 | Chougule et al. |
| 2017/0228715 A1 | 8/2017 | Gurunathan |
| 2017/0236118 A1 | 8/2017 | Laracey |
| 2018/0007052 A1 | 1/2018 | Quentin |
| 2018/0047016 A1 | 2/2018 | Sarin |
| 2018/0068308 A1 | 3/2018 | Gupta et al. |
| 2018/0082283 A1 | 3/2018 | Sharma |
| 2018/0157336 A1 | 6/2018 | Harris et al. |
| 2018/0322488 A1 | 11/2018 | Arana et al. |
| 2018/0365675 A1 | 12/2018 | Sivaraman |

(56) References Cited

U.S. PATENT DOCUMENTS

| | | | |
|---|---|---|---|
| 2018/0374076 | A1 | 12/2018 | Wheeler |
| 2019/0304029 | A1 | 10/2019 | Murray et al. |
| 2021/0166260 | A1 | 6/2021 | Ho et al. |

FOREIGN PATENT DOCUMENTS

| | | | |
|---|---|---|---|
| WO | WO-2013/079793 | A1 | 6/2013 |
| WO | WO-2014/012138 | A1 | 1/2014 |
| WO | WO-2014/111888 | A1 | 7/2014 |
| WO | WO-2014/207615 | A1 | 12/2014 |
| WO | WO-2015/016780 | A1 | 2/2015 |
| WO | WO-2015/023172 | A2 | 2/2015 |
| WO | WO-2016/009198 | A1 | 1/2016 |
| WO | WO-2016/053975 | A1 | 4/2016 |
| WO | WO-2016/097879 | A1 | 6/2016 |
| WO | WO-2016/172107 | A1 | 10/2016 |
| WO | WO-2016/196054 | A1 | 12/2016 |

OTHER PUBLICATIONS

Office Action on U.S. Appl. No. 14/266,580, dated Dec. 2, 2014, 10 pages.

White, Ron, "How Computers Work", Que Publishing, 7th Ed, Oct. 15, 2003, p. 4. 23 pages.

"Cashcloud Mobile eWallet", FinTech Forum Exchange, Jul. 1, 2016. 4 pages.

"Cashcloud mobile eWallet", Popote Payments, www.popotepayments.com, 2016. 6 pages.

A Smart Card Alliance Payments Council White Paper; Publication date: Sep. 2011; Publication No. PC-11002; 191 Clarksville Rd. Princeton Junction, NJ 08550 www.smartcardalliance.org (Year: 2011).

How to Control Children's Spending on Debit Cards | Money | by Jill Paperworth, May 10, 2009, https:www.theguardian.com/money/2009/mar/.../children-debit-cards-online-spend . . . (Year: 2009).

Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/profile/Tatsuo_Nakajima/publication/220982951_UbiPay_minimizing_transaction_costs_with_smart_mobile_payments/links/548e9dad0cf225bf66a607bb.pdf on Oct. 30, 2015, 8 pages.

Smart Card Alliance, "The Mobile Payments and NFC Landscape: A U.S. Perspective," Sep. 2011. 53 pages.

EMV, "Payment Tokenisation Specification Technical Framework", 2014 EMVCO, LLC. 84 pages.

Examiner's Answer issued in U.S. Appl. No. 15/401,664 dated Sep. 23, 2021.

Kyrillidis, Mayes, Markantonakis; Card-present Transactions On The Internet Using The Smart CardWeb Server; 2013, IEEE; 12th (Year: 2013).

Ron White, How Computers Work, Oct. 15, 2003, Que, 7th Edition, p. 4. (Year: 2003).

The University of Alaska staff, Managing Finance Reports with Vista Plus, Aug. 2008, The University of Alaska, web, 2-20 (Year: 2008).

Latterell, Kayla, "How Do Gift Cards Work?" https://www.cardsource.com/news/how-do-gift-cards-work, pp. 1-6.

J. Gao, V. Kulkarni, H. Ranavat, L. Chang and H. Mei, "A 2D Barcode-Based Mobile Payment System," 2009 Third International Conference on Multimedia and Ubiquitous Engineering, 2009, pp. 320-329, doi: 10.1109/MU E.2009.62. (Year: 2009).

Hany Herb, Hassan Farahat, and Mohamed Ezz, SecureSMSPay: Secure SMS Mobile Payment Model, 2008, 2008 2nd International Conference on Anti-counterfeiting, Security and Identification (pp. 11-17) (Year:2008).

\* cited by examiner

SYSTEMS AND METHODS FOR PEER-TO-PEER FUNDS REQUESTS

BACKGROUND

Consumers complete purchases of goods and services from merchants through various currency transfers. The consumers may provide payment to the merchants via cash, checks, credit cards, debit cards, automated clearing house ("ACH") transfers, internet payments, mobile wallets, and the like. A financial institution processing a payment from a customer to a merchant may reject the payment if the consumer does not have enough funds to complete the transaction. For example, if a consumer has exhausted his credit limit on his credit card, the credit card processor may deny the transaction request on account of lack of funds or credit. In such situations, the consumer may try another form of payment or leave without acquiring the goods or services from the merchant. However, often if a first a form of payment is unavailable due to lack of funds, other forms of payment are also unavailable due to lack of funds.

SUMMARY

One embodiment relates to a method a method of facilitating a payment to a merchant via a mobile wallet system provided by a financial institution computing system of a financial institution. The method includes receiving, by a processor of the financial institution computing system from a first user device, a request to fund a purchase of a first user from the merchant with funds from a second user via the mobile wallet system. The method further includes transmitting, by the processor, a message including the request to fund the purchase of the first user to a second user device associated with the second user. The method further includes transmitting, by the processor, updated payment information to the first user device, the updated payment information including a payment code. The method includes receiving, by the processor, a transaction request from a point of sale system associated with the merchant, the transaction request including the payment code. The method further includes transmitting, by the processor, an approval message to the point of sale system.

Another embodiment relates to a financial institution computing system associated with a financial institution. The system includes a network interface configured to communicate with a plurality of user devices and a merchant point of sale system associated with a merchant via a network. The system further includes an account database storing information relating to a plurality of financial accounts maintained by the financial institution. The system includes a memory and at least one processor. The at least one processor is configured to receive, from a first user device, a request to fund a purchase of a first user from the merchant with funds from a second user via a mobile wallet system maintained by the financial institution computing system. The at least one processor is further configured to transmit a message including the request to fund the purchase of the first user to a second user device associated with the second user. The at least one processor is configured to transmit updated payment information to the first user device, the updated payment information including a payment code. The at least one processor is further configured to receive a transaction request from the point of sale system, the transaction request including the payment code. The at least one processor is configured to transmit an approval message to the point of sale system.

A further embodiment relates to a method of preauthorizing purchase funding via a mobile wallet system provided by a financial institution computing system of a financial institution. The method includes receiving, by a processor of the financial institution computing system from a first user device, auto-fund permissions relating to a preauthorization for the financial institution to fund purchases of a second user of the mobile wallet system, wherein the auto-fund permissions include an identity of a second user and transaction restrictions. The method further includes receiving, by the processor, a request to fund a transaction at a merchant from an account associated with the first user, wherein the request is received from a point of sale system of the merchant. The method includes determining, by the processor, that the transaction at the merchant is within the permissions set forth in the transaction restrictions received from the first user. The method further includes transmitting, by the processor, an approval message to the point of sale system.

Another embodiment relates to a financial institution computing system associated with a financial institution. The system includes a network interface configured to communicate with a plurality of user devices and a merchant point of sale system associated with a merchant via a network. The system further includes an account database storing information relating to a plurality of financial accounts maintained by the financial institution. The system includes a memory and at least one processor. The at least one processor is configured to receive, from a first user device, auto-fund permissions relating to a preauthorization for the financial institution to fund purchases of a second user of the mobile wallet system, wherein the auto-fund permissions include an identity of a second user and transaction restrictions. The at least one processor is further configured to receive a request to fund a transaction at a merchant from an account associated with the first user, wherein the request is received from a point of sale system of the merchant. The at least one processor is configured to determine that the transaction at the merchant is within the permissions set forth in the transaction restrictions received from the first user. The at least one processor is further configured to transmit an approval message to the point of sale system.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, a financial institution computing system of a financial institution that provides a mobile wallet system to users is described. The mobile wallet system enables the users to provide payments to merchants via the mobile wallet system. Users' mobile wallets are linked to payment forms associated with the users (e.g., bank accounts, credit cards, gift cards, etc.). To pay for a good or service provided by a merchant, a user selects a form of payment and provides a code to the merchant, which is used by a merchant computing system to initiate payment from the user to the merchant via the financial institution computing system. The code may be a barcode, a two-dimensional barcode, a quick response ("QR") code, or another code displayed on a mobile device (e.g., a smartphone) of the user such that the code is scannable by a merchant's point of sale ("POS") system or identifiable by an employee of the merchant. In an alternative arrangement, the code may be wireless transmitted to the merchant POS system from the user's mobile device (e.g., via Bluetooth®, near field communication, radio frequency identification, 802.11 wireless networking, ZigBee®, etc.). Additionally, the mobile wallet system allows a first user to contact a second user of the mobile wallet system to request funding for certain transactions.

Figure 1:
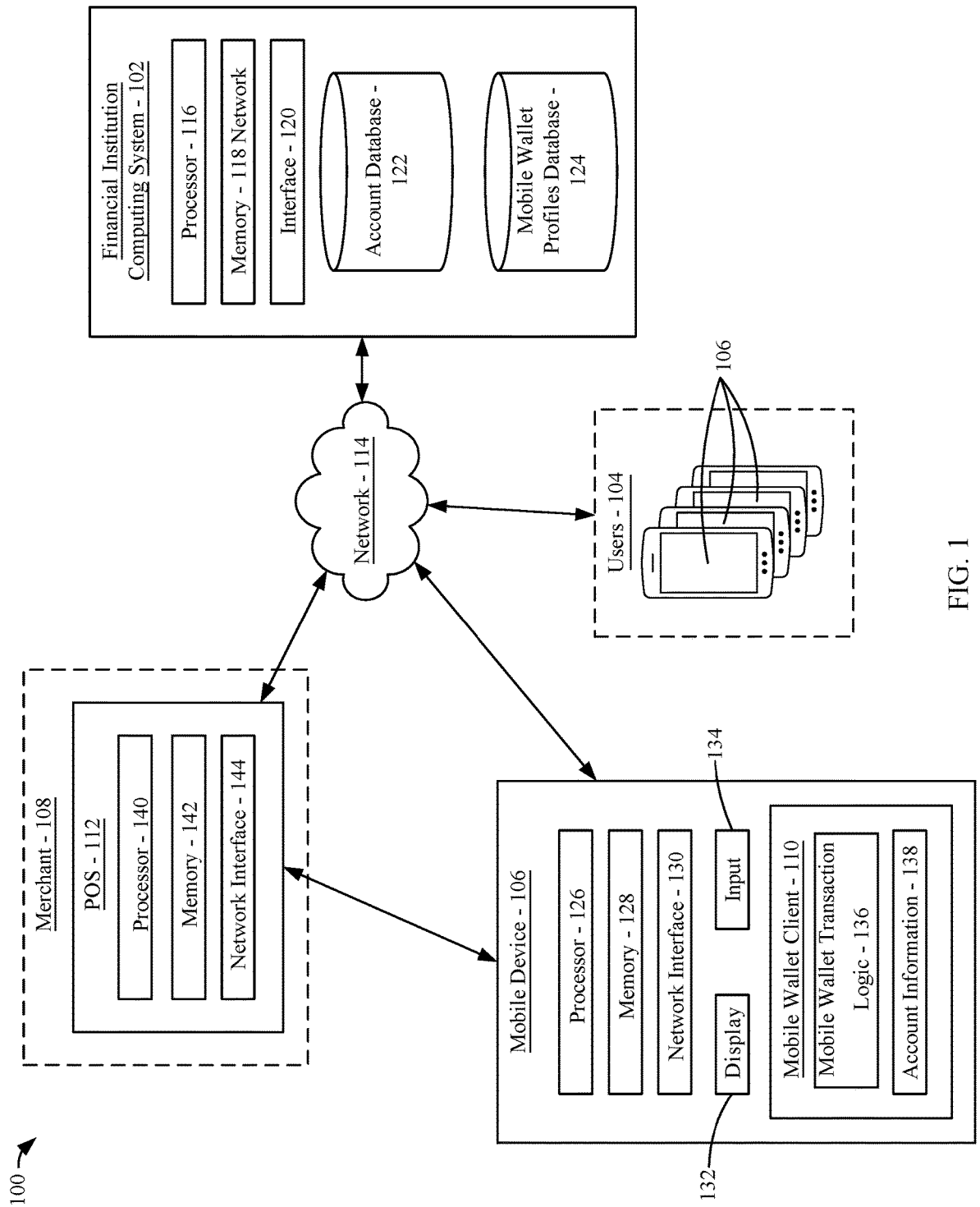
FIG. 1 is a diagram of a computing system according to an exemplary embodiment.

Referring to FIG. 1, a diagram of a computing system 100 is shown according to an exemplary embodiment. The computing system 100 includes a financial institution computing system 102. The financial institution computing system 102 is associated with a financial institution, such as a bank. The financial institution provides users 104 (e.g., account holders, mobile wallet users, etc.) a mobile wallet system. As described in further detail below, the mobile wallet system allows the users 104 to use their mobile devices 106 to provide payment for goods and services offered by a merchant 108.

When a user 104 wishes to purchase a good or service from the merchant, the user 104 can request a payment code from the mobile wallet system to provide to a merchant POS system 112. Accordingly, the user 104 interacts with a mobile wallet client 110 on the user's mobile device 106, which requests a payment code from the financial institution computing system 102 via a network 114 based on a user-selected payment source. The network 114 may be the Internet. The financial institution computing system 102 returns a payment code. The payment code may be a barcode, a two-dimensional barcode, a quick response ("QR") code, or another code that is displayed on a display of the mobile device 106. The code is input into the POS system 112 (e.g., by scanning of the barcode or QR code, by manual entry of the code by an employee into the POS system 112, wireless transmission of the code from the mobile device to the POS system 112, etc.), where the code is sent, along with transaction information (e.g., amount of the transaction, retailer identification information, etc.), to the financial institution computing system 102 via the network 114. Based on the transaction information and the received code, the financial institution 102 determines whether to permit the transaction, and thus the funds transfer from the user 104 to the merchant 108, or to reject the transaction (e.g., due to lack of funds in the user's account or due to the transaction being non-permitted). The financial institution computing system 102 then returns either a transaction confirmation or denial to the POS system 112 to provide an indication to the merchant 108 as to the approval status of the funds transfer.

Still referring to FIG. 1, the financial institution computing system 102 includes a processor 116 and memory 118. In some arrangements, the financial institution computing system 102 includes a plurality of processors. The memory 118 stores programming modules that, when executed by the processor 116, control the operation of the financial institution computing system 102. The programming modules include mobile wallet transaction logic that allows the financial institution computing system 102 to provide the mobile wallet system to users 104 and to the merchant 108. The financial institution computing system 102 includes a network interface 120 that allows the financial institution computing system 102 to communicate data to and from other devices (e.g., mobile device 106, the merchant POS system 112, etc.) via the network 114. The financial institution computing system 102 maintains various information related to customer accounts in an account database 122. In some arrangements, the account database 122 is split into multiple account databases. The account database 122 is where the financial institution computing system 102 stores information relating to financial accounts held with the financial institution, including account balance information and account ownership information. The financial institution computing system 102 further includes a mobile wallet profiles database 124. The mobile wallets profiles database 124 maintains a database of mobile wallet users 104 and associations of the mobile wallet users 104 with various accounts in the account databases 122 (e g, linking a user's mobile wallet to the user's checking account with the financial institution). Further, the mobile wallet profiles database 124 stores other information concerning the users' mobile wallets, such as contacts lists, user repayment plans, purchase restrictions, and the like.

The mobile device 106 may be used by an individual user (e.g., a business owner or employee, a consumer, and so on) to create and interact with a mobile wallet account maintained by the financial institution computing system 102. The mobile device 106 may, for example be, handheld computer, a cellular phone, smartphone, mobile handheld wireless e-mail device, a tablet computer, personal digital assistant, portable gaming devices, or another suitable device. The mobile device 106 includes a processor 126 and memory 128. The memory 128 includes programming modules and logic that, when executed by the processor 126, control the operation of the mobile device 106. In some arrangements, the memory 128 includes the mobile wallet client 110. The mobile device 106 includes a network interface 130. The network interface 130 may be a wireless network interface that communicates with a wireless communication protocol (e.g., 802.11a/b/g/n, Bluetooth®, ZigBee®, CDMA, GSM, LTE, WiMax, etc.). The mobile device 106 includes a display 132 and an input 134. In some arrangements, the display 132 and input 134 are integrated in a touchscreen display. The mobile device 106 may receive and display user interfaces including account information, transaction instructions, and so on. In some arrangements, the user interfaces may be used to initiate payments from the user's mobile wallet to merchants 108. In other arrangements, the user interfaces may be used to facilitate a third-party mobile wallet user funding a purchase by the user. As will be appreciated, in addition to or instead of the mobile device 106, users may also be provided with the ability to access the mobile wallet system using another type of computer (e.g., a desktop or laptop computer executing browser software) to perform the operations described herein as being performed by the mobile device 106.

The mobile wallet client 110 includes program logic executable by the processor 126 to implement at least some or all of the functions described herein. As will be appreciated, the level of functionality that resides on the mobile device 106 as opposed to the financial institution computing system 102 may vary depending on the implementation. The mobile wallet client 110 may be a web browser that is configured to receive and display mobile web pages (e.g., web pages prompting the user to provide information to create an account, web pages displaying account balance information and past transactions, and so on) or an application executed by the mobile device 106. The mobile wallet client 110 may also include a code/token generator capable of generating a unique code/token for each transaction. The unique code/token may then be transmitted by the mobile device 106 as part of a transaction to facilitate authentication of the transaction and the user of the mobile device 106. As will be appreciated, the user may also use other devices (e.g., laptop or desktop computer system, not shown) to create and access the mobile wallet accounts.

In FIG. 1, the mobile wallet client 110 is used in connection with the merchant POS system 108 located at various physical store locations. In some arrangements, the merchant POS system 108 is a web server that hosts an internet retailer website. Accordingly, the mobile wallet client 110 may also be used in connection with online transactions via the internet retailer. For example, in another embodiment, merchants 106 may be provided with the ability to have a mobile storefront and profile within the mobile wallet client 110. For example, the merchants 108 may be provided with the ability to display marketing material, provide information, and promote products or discounts. Merchants 108 may also be provided with the ability to sell items directly through their mobile storefront for the account holder to purchase from within the mobile client 110.

The mobile wallet client 110 may include, among other features, transaction logic 136 and account information 138. The transaction logic 136 allows users 104 of the mobile devices 106 to provide funds to the merchants 108 in exchange for goods or services from an account with maintained by the financial institution computing system 102 via the mobile wallet client 110. This process is described in further detail in U.S. patent application Ser. No. 14/501,856, entitled "MOBILE WALLET ACCOUNT ACTIVATION SYSTEMS AND METHODS," filed on Sep. 30, 2014, and in U.S. patent application Ser. No. 14/501,880, entitled "MOBILE WALLET ACCOUNT PROVISIONING SYSTEMS AND METHODS," filed on Sep. 30, 2014, both of which are hereby incorporated by reference in their entireties and for all purposes. The account information 136 stores associations between the user 104 and any accounts the users 104 that may be associated with at the financial institution. The account information 136 is periodically updated based on information received from the financial institution computing system 102 (e.g., every minute, every ten minutes, every time the user logs into the mobile wallet client 110, etc.). The account information 138 may also include the user's mobile wallet contact book or listing. The contact book or listing includes information relating to other mobile wallet users associated with the user. For example, John's mobile wallet contact book may include relatives and friends that are also mobile wallet users, such as his mom, his dad, his sister, and the like, as well as friends. The contact book or listing may pull contact information from the financial institution computing system 102 or another contact database stored in the memory 128.

Still referring to FIG. 1, the merchant POS system 112 includes a processor 140 and memory 142. The memory 142 stores programming modules and logic that, when executed by the processor 140, control the operation of the merchant POS system 112. The merchant POS system also includes a network interface 144. The network interface 144 allows the POS system 112 to communicate data to and from the mobile device 106 directly or via the network 114 and to and from the financial institution computing system 102 via the network 114. The memory 142 includes transaction logic that allows the POS system 112 to accept mobile wallet payments from the mobile devices 106. The payments are account transfers from the financial institution into accounts associated with the merchant 108.

Figure 2:
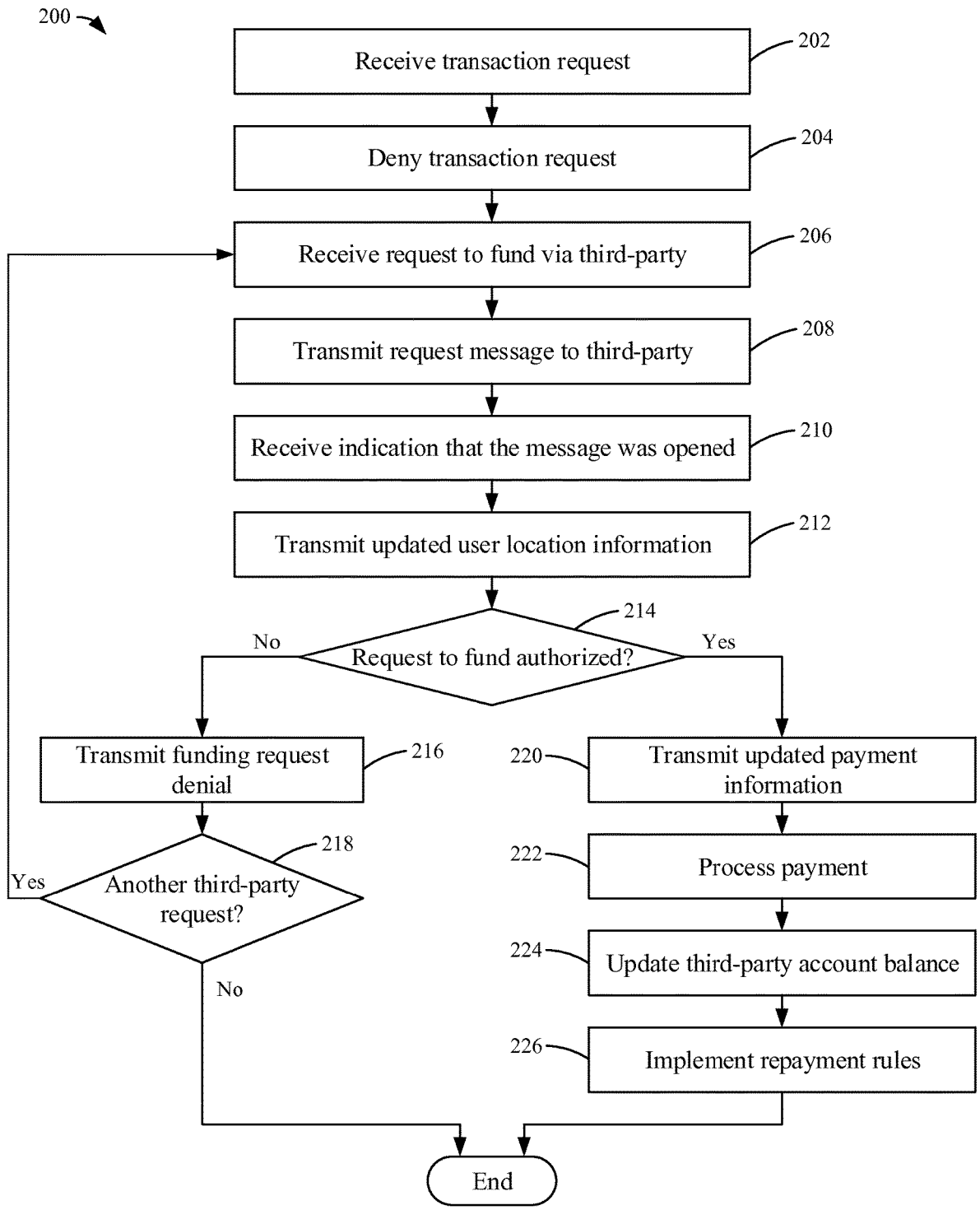
FIG. 2 is a flow diagram of a method 200 of facilitating third-party payment for a transaction that was previously denied for lack of funds via a mobile wallet system according to an exemplary embodiment.

Referring to FIG. 2, a flow diagram of a method 200 of facilitating third-party payment for a transaction that was previously denied for lack of funds via a mobile wallet system is shown according to an exemplary embodiment. Generally, method 200 is initiated when a first user attempts to make a purchase from merchant 108 via the mobile wallet client 110 running on the first user's mobile device. The merchant POS system 112 relays payment information from the mobile wallet client 110 (e.g., by scanning a barcode presented on the display 132) to the financial institution computing system 102, however, the financial institution computing system 102 indicates to the POS system 112 returns a transaction rejection because the first user does not have sufficient funds in his account. The POS system 112 then denies the transaction. The first user, via the mobile wallet client 110, is presented the opportunity to contact a third-party (i.e., a second mobile wallet user), such as a relative or friend of the first user, to request funding for the transaction. The second user can then fund the previously denied transaction via the mobile wallet system. Method 200 is performed by the financial institution computing system 102 (e.g., by processor 116 controlling the various components of the financial institution computing system 102). Method 200 is described in further detail below.

Method 200 begins when a transaction request is received at 202. The transaction request is received by the financial institution computing system 102 from the merchant POS system 112 via the network 114. The transaction request indicates that the first user is attempting to pay for a purchase from the merchant 108 via the first user's mobile wallet. Accordingly, the transaction includes information identifying the first user and an identification of a payment source, such as the first user's checking account information or credit card information. Additionally, the transaction request includes information about the purchase. The purchase information includes an identity of the merchant 108 and a cost of the purchase. In some arrangements, the purchase information also includes an identification of the specific items or goods attempted to be purchased by the first user.

The transaction request is denied at 204. When the financial institution computing system 102 receives the transaction request, the financial institution computing system 102 checks the first user's account (e.g., a credit card, a checking account, etc.) for sufficient funds to complete the transaction. The financial institution computing system 102 cross-references the account database 122 to determine whether there are sufficient funds in the first user's account to complete the transaction. If there are sufficient funds, the financial institution computing system 102 transmits an approval message to the POS system 112 and transfers funds from the first user's account to an account associated with the merchant 108. However, in method 200, the first user's account does not have sufficient funds to complete the transaction. Accordingly, the financial institution computing system 102 transmits a transaction denial message to the POS system 112.

Figure 3:
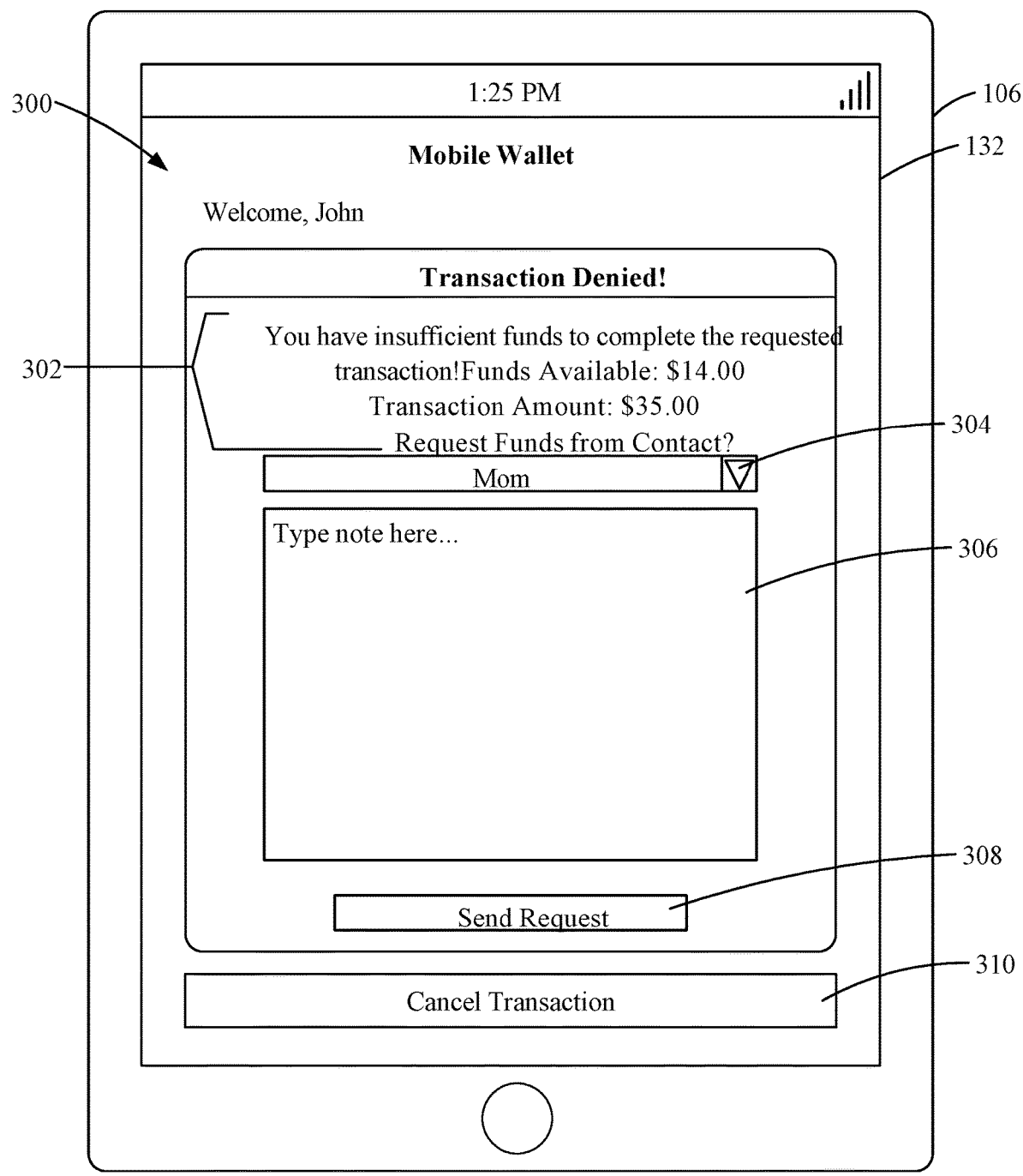
FIG. 3 is an exemplary user interface of a mobile wallet client as presented on the display of a mobile device of FIG. 1 according to an exemplary embodiment.

Additionally, the financial institution computing system 102 transmits a transaction denial message to the first user's mobile device. For example, FIG. 3 shows an exemplary user interface 300 of the mobile wallet client 110 as presented on the display 132 of the mobile device 106 associated with the first user. The user interface 300 is populated based on information received from the financial institution computing system 102. In some arrangements, the financial institution computing system 102 pushes the user interface 300 to the user device 106. The user interface 300 includes an indication 302 that the transaction was denied for insufficient funds. The indication may include an amount of the transaction and an amount of funds available in the first user's account. The user interface 300 further includes the option for the first user to request funds for the transaction from a second mobile wallet user, such as a contact. Accordingly, the user interface 300 allows the first user to select a second user from a contact list (e.g., via a drop down list 304). The second user is also a registered user of the mobile wallet system. The second user is a person that the first user would like to request funds from in order to proceed with the transaction with the merchant 108. For example, the second user may be the first user's mom. After the first user selects a second user, the first user has the option to send a note to the second user along with the request to fund by interacting with the note field 306 of the user interface 300. For example, the first user may indicate to the second user that the originally denied transaction is to purchase books for school. After the first user has entered a note, or if the first user does not want to enter the note, the first user can either send the request (e.g., by interacting with the "send request" button 308) or cancel the transaction altogether (e.g., by interacting with the "cancel transaction" button 310).

A request to fund via a third-party is received at 206. The financial institution computing system 102 receives the request to fund via the third-party from the first user's mobile device. For example, the request may be sent from the first user's mobile device after the first user interacts with the "send request" button 308. The request includes an identification of the second user targeted in the request, an indication of the amount of funds needed, an identity of the requestor (i.e., the first user), a time of the request, a merchant identifier, a merchant location, and any note included in the request by the first user. A funding request message is transmitted at 208. The financial institution computing system 102 transmits the funding request message to the second user's mobile device. The request may be transmitted as an e-mail message or an in-application message (e.g., a push notification processed by the mobile wallet client 110). The request includes information about the previously denied transaction. The information includes the requestor's identity (i.e., the first user's identity), an amount of money requested, a date and time of the request, an identification of the merchant 108 associated with the previously denied transaction, a location of the merchant 108, a note from the requestor (if provided by the first user), and a location of the first user.

An indication that the funding request message was opened is received at 210. The financial institution computing system 102 receives an indication from the second user's mobile device. The indication informs the financial institution computing system 102 that the second user is viewing the funding request message. In response to receiving the indication at 210, updated first user location information is transmitted to the second user's mobile device at 212. The financial institution computing system 102 requests location information relating to the first user's mobile device and transmits the received location information to the second user's mobile device. The updated first user location information lets the second user know where the first user is at the time of the contact reading the funding request message. The first user's location may be used by the second user to determine that the first user is in the vicinity of the merchant 108. This information may be used by the second user to determine that the first user is still seeking funding for the purchase and that the request is still valid. For example, if the current location of the first user is fifty miles away from the merchant 108, the second user may choose to deny the request for funding because it is evident that the first user no longer needs the goods or services offered by the merchant 108. The updated first user location is displayed to the second user along with the funding request message.

Figure 4:
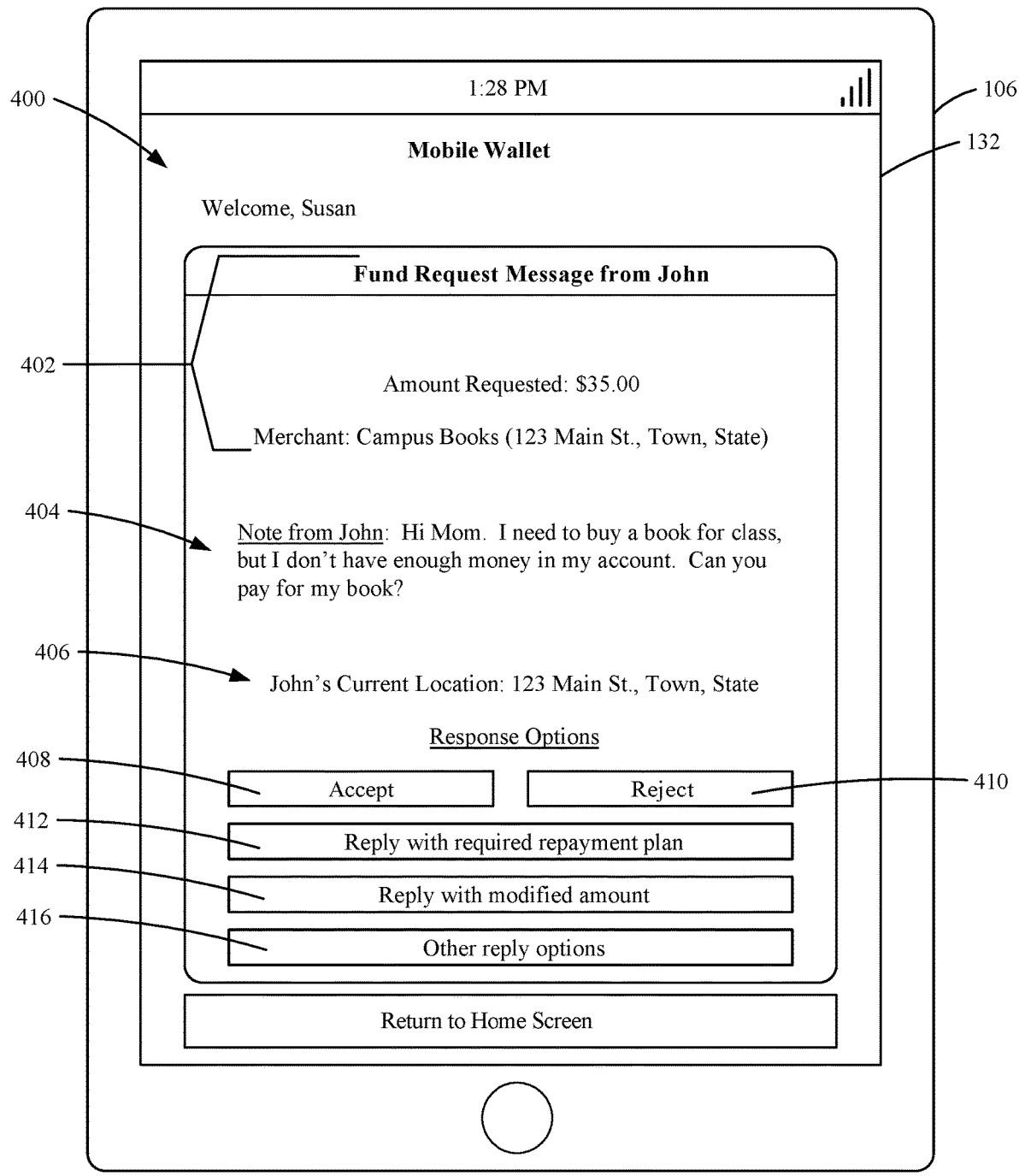
FIG. 4 is another exemplary user interface of a mobile wallet client as presented on the display of a mobile device of FIG. 1 according to an exemplary embodiment.

Referring to FIG. 4 shows an exemplary user interface 400 of the mobile wallet client 110 as presented on the display 132 of the mobile device 106. The user interface 400 shows the mobile device 106 of the second user that received the funding request message from the first user. As shown in FIG. 4, the fund request message provides basic information 402 relating to the fund request. The basic information 402 includes an identification of the first user (e.g., "John"), a date and time of the request, an amount of money requested, and an identification of the merchant where the funds will be spent. In some arrangements, the identification of the merchant also includes a location of the merchant (e.g., a street address). The fund request message includes a note 404 from the first user if the first user included the optional note in the fund request. Additionally, the fund request message includes current first user location information 408. The current first user location information 408 is received from the first user's mobile device at 210 of method 200. In some arrangements, the current first user location information 408 is updated periodically (e.g., every minute, every five minutes, etc.) or in real time.

The user interface 400 includes a plurality of response options. The response options allow the second user to accept the funding request as sent by interacting with the accept button 408 or to reject the funding request by interacting with the reject button 410. The second user can also alter the initial request. For example, the second user may reply to the initial request with a conditional acceptance of the funding request contingent on the first user agreeing to a repayment plan by interacting with button 412. The repayment plan terms may be set by the second user. The repayment plan may include repayment of the amount requested and interest accrued at an interest rate set by the second user. The repayment plan may include automatic payments (e.g., monthly payments until the requested amount is returned, a single payment repaying the total amount owed to the contact at a scheduled date, etc.) from an account of the first user into an account of the second user that are facilitated by the financial institution computing system 102. The second user can also respond with a modified amount by interacting with button 414. For example, as shown in FIG. 4, the request is for thirty five dollars; however, the second user may only want to provide twenty dollars of funding to the first user. Button 414 allows the second user to provide a different amount of funding than requested. Other reply options may be provided by interacting with button 416. For example, the other reply options may allow the second user to limit the provided funds to only purchases of specified items, to limit the provided funds to only certain merchants, to provide an expiration for the provided funds, and the like. In some arrangements, the other reply options allow the second user to suggest splitting the cost of the attempted transaction with the first user or other mobile wallet users (e.g., a third user, a fourth user, etc.). For example, the second user can reply with the offer to pay for a certain percentage of the transaction (e.g., the first user pays 50% while the second user pays the remaining 50%). In such arrangements, if the first user accepts the split transaction, the payment code generated (at 220 as discussed below) may draw funds from multiple payment sources at the agreed upon split percentages: an account associated with the first user and an account associated with the second user.

Referring again to FIG. 2, the second user decides whether to accept the request to fund from the first user or to deny the request to fund at 214. Based on the second user's decision, the second user's mobile device transmits the decision to the financial institution computing system 102. If the second user denied request for funds (e.g., by interacting with the reject button 410 of user interface 400), a funding request denial is transmitted to the first user's user mobile device at 216. In some arrangements, the financial institution computing system 102 transmits a denial at 216 if the second user has not responded to the request within a set period of time (e.g., within thirty minutes). In such arrangements, the request to fund expired and is no longer acceptable by the second user. The financial institution computing system 102 then determines whether the first user wants to send another funding request to another contact at 218. The first user can restart the process and transmit a request to another contact (e.g., another mobile wallet user). In these situations, method 200 returns to step 206. In some arrangements, any additional requests sent by the first user to other contacts may include an indication that the first user previously requested funds from at least one other contact (i.e., the second user), and the at least one other contact already denied the first user's request. For example, if a child first requests funds from his mother, and the mother hasn't responded or denied the initial request, the child may send a second fund request to his dad. The second fund request includes an indication that the child previously requested funds from his mother, but that the mother did not approve of the fund request. Based on this information, the dad may decide not to approve the fund request as well. If no additional request is sent by the first user, method 200 ends.

Figure 5:
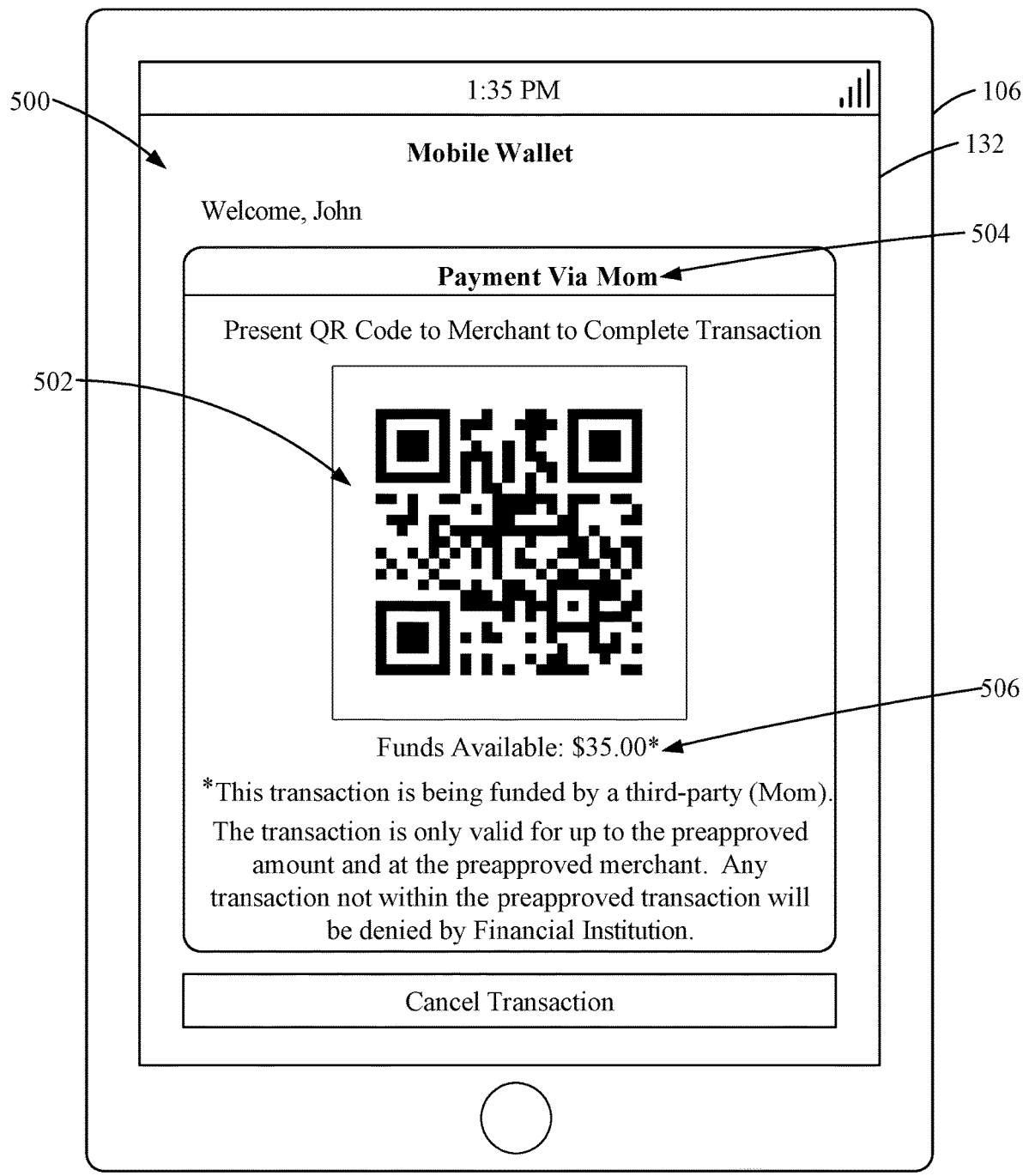
FIG. 5 is another exemplary user interface of a mobile wallet client as presented on the display of a mobile device of FIG. 1 according to an exemplary embodiment.

If the second user approved the funding request at 214, updated payment information is transmitted at 220. The updated payment information is transmitted from the financial institution computing system 102 to the first user's mobile device. The updated payment information includes a payment code. In some arrangements, the payment code can be displayed on the display of the first user's mobile device such that the payment code can be input into the merchant POS system 112 (e.g., by manually typing the payment code into the POS system 112, by scanning the payment code, etc.). In such arrangements, the payment code may be a barcode, a QR code, a string of numbers, or the like, that can then be relayed to the merchant POS system 112 to complete the transaction. In other arrangements, the payment code is a digital token or file that can be transmitted to the merchant POS system 112 from the first user's mobile device (e.g., via Bluetooth®, near field communication, radio frequency identification, WiFi, ZigBee®, etc.). The payment code may be a limited use payment code (e.g., a one-time use payment code). In some arrangements, the payment code includes a geographic restriction (e.g., the payment code is only valid in certain geography defined by the second user). For example, FIG. 5 shows an exemplary user interface 500 of the mobile wallet client 110 as presented on the display 132 of the mobile device 106 associated with the first user. The user interface 500 includes a QR code 502, which can be scanned by the merchant POS system 112 to effectuate payment from the second user (i.e., the individual funding the first user's purchase) to the merchant 108. The user interface 500 may also indicate that the payment is coming from a contact of the first user (e.g. as shown here, the payment is coming from "Mom") at 504 and an indication of the amount of money that is approved for the specific transaction at 506.

The payment to the merchant 108 is processed at 222. The financial institution computing system 102 receives an updated transaction request with the updated payment information from the merchant POS system 112. The updated transaction request includes the payment code. The financial institution computing system 102 verifies that the funds are available in the contact's account in a similar manner as discussed above with respect to 204. When the payment is processed, the financial institution computing system 102 transmits an approval message to the merchant POS system 102. In some arrangements, the financial institution computing system 102 also transmits approval messages to the user devices 106 associated with both the first user and the second user. The second user's account balance is updated at 224. The financial institution computing system 102 updates the appropriate account balance in the account database 122 to account for the payment to the merchant 108. If the first user agreed to a repayment plan, the financial institution computing system 102 implements the repayment rules associated with the repayment plan at 226. For example, the financial institution computing system 102 may schedule an automatic payment from an account associated with the first user to an account associated with the second user.

Figure 6:
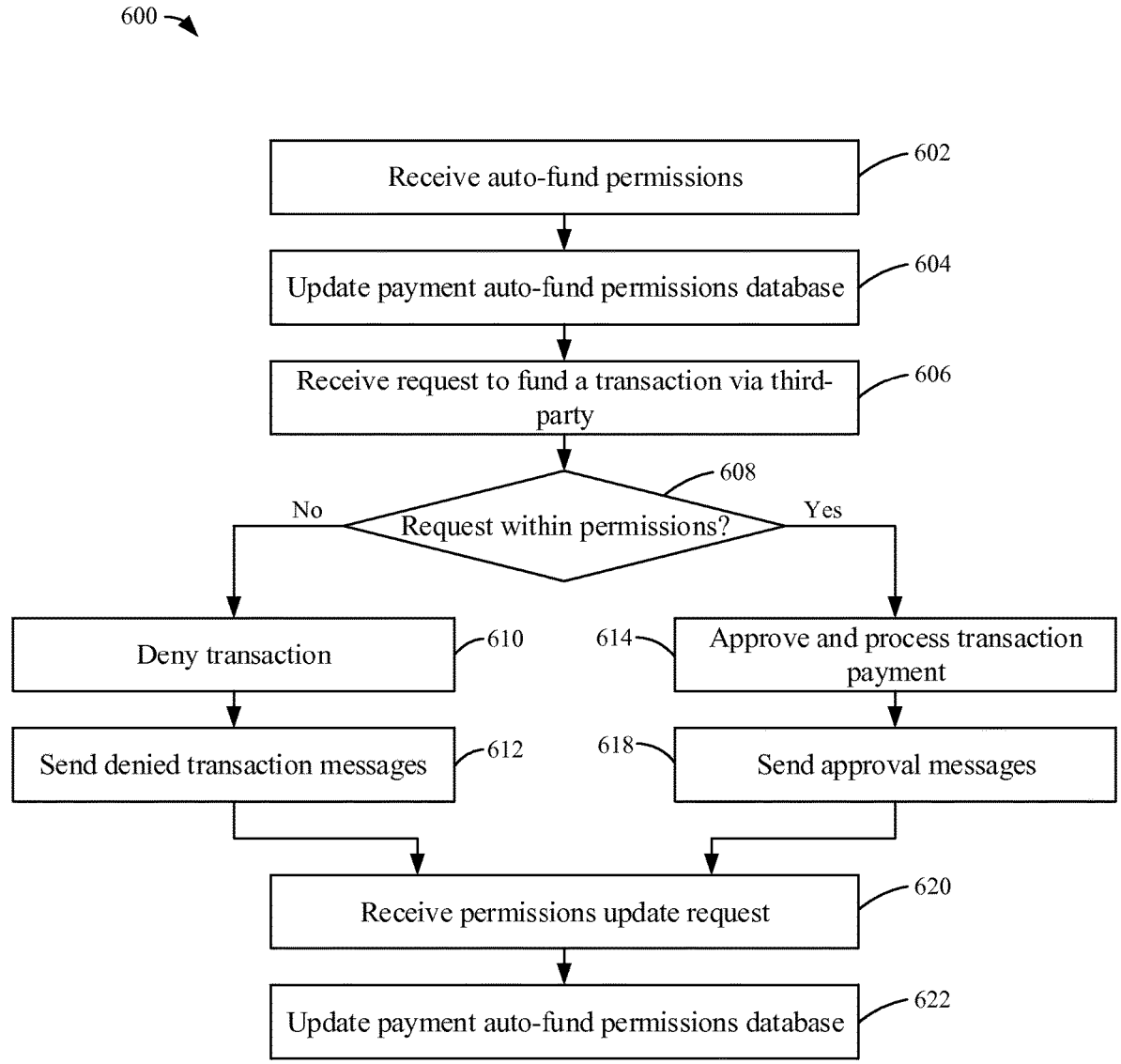
FIG. 6 is a flow diagram of a method of automatically funding transactions of a user from a third-party's account according to an exemplary embodiment.

Referring to FIG. 6, a flow diagram of a method 600 of automatically funding transactions of a user from a third-party's account is shown according to an exemplary embodiment. In some arrangements, the mobile wallet system allows a first user (i.e., a first mobile wallet user) to preauthorize funding for transactions initiated by a second user (i.e., a second mobile wallet user) without an initial denied transaction (e.g., as described above with respect to method 200). For example, a mother may preauthorize her son to purchase certain items or initiate a transaction that is funded from the mother's account. As described in further detail, the first user can setup auto-fund permissions that allow the second user to make purchases funded from the first user's account without asking for approval each time. If the attempted transaction of the second user is within the permissions setup by the first user, the transaction will go through. Then, the first user will have the opportunity to fine-tune the permissions based on the transaction. Method 600 is performed by the financial institution computing system 102 (e.g., by processor 116 controlling the various components of the financial institution computing system 102). Method 600 is described in further detail below.

Method 600 begins when auto-fund permissions are received at 602. Auto-fund permissions are received at the financial institution computing system 102 from a first user's mobile device. The auto-fund permissions indicate a preauthorization for the financial institution to fund purchases of a second user of the mobile wallet system. The preauthorization relates to a one-off funding preauthorization (e.g., for a single purchase made by the second user) or to an open-ended preauthorization for purchases made by the second user (e.g., at a specific merchant). The auto-fund permissions include the identity of the second user (e.g., at least one of a username, a phone number, an e-mail address, etc.) and transaction restrictions. The transaction restrictions define which transactions are to be authorized by the financial institution computing system 102 and which transactions are to be denied by the financial institution computing system 102. The transaction restrictions may include an approved amount limit. The amount limit may limit the amount of an individual transaction (e.g., preauthorization for transactions under thirty dollars) and/or the amount of a series of transactions occurring within a given time period (e.g., preauthorization for transactions not to exceed one hundred dollars within a calendar month, within a week, etc.). The transaction limits may include limitations on the merchant, such as limiting preauthorized transactions to specific merchants, limiting transactions to specific classes or types of merchants (e.g., grocery stores, gas stations, etc.), and excluding transactions from specific merchants or from specific classes or types of merchants (e.g., liquor stores). The transaction limits may also include geographic limitations, such as limiting purchases to certain occurring at merchants within specific geographic regions or excluding purchases attempted at merchants within specific geographic regions. The geographic regions may be defined the first user as a country, a state, a county, a city, a geofence (e.g., a geographic area defined by a plurality of geographic points, such as GPS coordinates or landmarks; within a specific building, such as a shopping mall; etc.), or a combination thereof. In some arrangements, the first user may opt to have the financial institution set default transaction restrictions. As set forth in further detail below, the initial transaction restrictions may be fine-tuned based on approved or denied transactions.

The payment auto-fund permissions database is updated at 604. The financial institution computing system 102 updates an internal database that stores the auto-fund permissions of its mobile wallet users. In some arrangements, the auto-fund permissions are stored in the mobile wallet profiles database 124. After the auto-fund permissions database is updated, the second user's mobile wallet may display the first user as a payment source along with other payment sources (e.g., the second user's bank accounts, credit cards, etc.) during transactions. For example, when the second user is attempting to make a purchase from the merchant 108 via the mobile wallet client 110 running on the second user's mobile device 106, the second user can select the first user as a payment source for the contemplated transaction.

A request to fund a transaction via a third-party is received at 606. The request is received by the financial institution computing system 102 from the second user. In some arrangements, the request is received via the merchant POS system 112. In such arrangements, the second user provided a payment code to the merchant POS system 112 in a similar manner as described above with steps 220 and 222 of method 200. Accordingly, the request may include a payment code generated by the mobile wallet client 110 (via the financial institution computing system 102) that identifies the first user as the payment source. The second user is attempting to pay for goods or services from the merchant 108 via the mobile wallet client 110. In attempting the transaction, the second user selected to fund the transaction via the first user. The request includes transaction information. The transaction information includes an identification of the second user, a payment source (i.e., the first user), a transaction amount, and an identification of the merchant 108. The financial institution computing system 102 determines whether the request is within the auto-fund permissions set up by the first user at 608. The financial institution computing system 102 cross-references the received transaction information against the auto-fund permissions stored in the auto-fund permissions database.

If the request is not within the auto-fund permissions, the transaction is denied at 610. The financial institution computing system 102 transmits a denial to the merchant POS system 112 to inform the merchant 108 that funds will not be provided. Additionally, denied transaction messages are sent at 612. The financial institution computing system 102 sends denied transaction messages to the mobile devices 106 of both the first user and the second user. In some arrangements, the denied transaction messages include information about the attempted transaction (e.g., amount, merchant identification, location information of the second user at the time of the attempted transaction, specific items being purchased in the attempted transaction, and the like) and a rationale for why the transaction was denied (e.g., attempted transaction exceeds the preauthorized limit, the merchant is an excluded merchant, etc.).

If the request is within the auto-fund permissions, the transaction is approved and payment is processed at 614. The financial institution computing system 102 transmits an approval to the merchant POS system 112 such that the merchant 108 can proceed with the transaction. Approval messages are sent at 618. The financial institution computing system 102 transmits a first approval message to the second user's mobile device to indicate that funding for the transaction was approved. The financial institution computing system 102 transmits a second approval message to the first user's mobile device to indicate that a transaction for the second user was funded based on the auto-fund permissions. The second approval message includes information about the attempted transaction (e.g., amount, merchant identification, location information of the second user at the time of the attempted transaction, specific items being purchased in the attempted transaction, and the like).

If the transaction contemplated in the auto-fund permissions received at 602 is a one-off transaction, then method 600 ends after the denied transaction messages are transmitted at 612 or after the approval messages are transmitted at 618. If the auto-fund permissions received at 602 relate to a plurality of preauthorized transactions, the first user has the opportunity to fine-tune the auto-fund permissions based on received any denied transaction messages or any approval messages. For example, a received denied transaction message may indicate that the second user attempted to have the first user pay for a purchase at the merchant 108. However, the merchant 108 is included in a category of merchants not permitted in the initial auto-fund permissions. In such a situation, the denied transaction message may allow the first user to add the merchant 108 to permitted merchants such that future attempted transactions by the second user at the merchant 108 would be allowed (assuming the attempted transaction meets the other rules set forth in the auto-fund permissions). Additionally, if the transaction is denied based on the permissions, the second user may still send a request for (manual) approval of the contemplated purchase to the first user. For example, the second user can send a funding request message similar to those contemplated in method 200 after the initial contemplated transaction was automatically denied by the system. The message may include an explanation as to why the request should be approved by the first user (e.g., "Please Mom! I really need these shoes!"). Similarly, a transaction that was allowed (as indicated in an approval message) may be used by the first user to fine tune the initial auto-fund permissions such that later attempted transactions matching the one that was allowed are later denied the future.

Accordingly, a permissions update request is received at 620. The financial institution computing system 102 receives the permissions update request from the mobile device 106 associated with the first user. The permissions update request includes updated transaction restrictions. The updated transaction restrictions are provided in response to receipt of messages at 612 or 618. The messages received at 612 or 618 may include options for the first user to fine-tune the initially provided auto-fund permissions by modifying any previously provided transaction restrictions. The updated transaction restrictions may further limit the second user's access to the first user's funds or expand on the second user's ability to access the first user's funds. The auto-fund permissions database is updated at 622. The financial institution computing system 102 updates the stored auto-fund permissions based on the received updated transaction restrictions.

The above-described mobile wallet systems and methods allow mobile wallet users to pay for goods and services from merchants even when the users do not have sufficient funds in the account. The users reach out to contacts, such as friends and relatives, for funding of transactions. The mobile wallet systems and methods allow for quicker transactions in circumstances where users attempting purchases do not have sufficient funds because the users can ask for funding on the spot, without needing to go through traditional loan sources, such as banks and lenders. Additionally, the above-described mobile wallet systems and methods permit users to preauthorize funding requests of other users, which also leads to quicker transactions by eliminating the need for individual funding requests.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A financial institution computing system associated with a financial institution, the system comprising:
    a network interface configured to communicate with a plurality of user devices and a merchant point of sale system associated with a merchant via a network;
    an account database storing information relating to a plurality of financial accounts maintained by the financial institution;
    a memory; and
    at least one processor coupled to the memory that stores instructions that, when executed by the at least one processor, cause the at least one processor to:
        receive, from a first user device, a request to fund a purchase of a first user from the merchant with funds from a second user via a mobile wallet system maintained by the financial institution computing system, wherein the request to fund the purchase is received after the first user attempted an initial transaction which was denied by the financial institution;
        transmit a message including the request to fund the purchase of the first user to a second user device associated with the second user, the request comprising a location of the merchant;
        receive, from the second user device, an indication that the message is being viewed by the second user;
        in response to receiving the indication that the message is being viewed, (1) generate a request for updated location information, (2) transmit the request for updated location information to the first user device, (3) receive the updated location information from the first user device, and (4) transmit the updated location information of a current location of the first user device to the second user device; and
        upon receiving an approval from the second user device, the approval comprising funds expiration information;
        (1) generate a digital token corresponding to a financial account of the second user, the digital token comprising a scannable quick response (QR) code and further comprising a geographic restriction defined by the second user such that the digital token is valid only at the location of the merchant;
        (2) transmit updated payment information to the first user device, the updated payment information including the digital token;
        (3) receive an updated transaction request from the merchant point of sale system, the updated transaction request including the digital token transmitted in accordance with the funds expiration information from the first user device to the merchant point of sale system; and
        (4) transmit an approval message to a point of sale system.

2. The system of claim 1, wherein the at least one processor coupled to the memory stores instructions that, when executed by the at least one processor, further cause the at least one processor to transmit updated location information relating to the location of the first user device to the second user device.

3. The system of claim 1, wherein the at least one processor coupled to the memory stores instructions that, when executed by the at least one processor, further cause the at least one processor to:
    receive a funding request denial from the second user device;
    receive a second request to fund the purchase of the first user, wherein the second request identifies a third user as a source of funds to fund the purchase; and
    transmit a second message including the second request to a third user device associated with the third user.

4. The system of claim 3, wherein the second message indicates that the second user already denied the request.

5. The system of claim 1, wherein the at least one processor coupled to the memory stores instructions that, when executed by the at least one processor, further cause the at least one processor to transfer the funds, upon verification of the digital token, from a first account associated with the second user into a second account associated with the merchant, in response to the updated transaction request from the merchant point of sale system.

6. The system of claim 1, wherein the at least one processor coupled to the memory stores instructions that, when executed by the at least one processor, further cause the at least one processor to schedule an automated transfer from a first account associated with the first user to a second account associated with the second user based on a repayment agreement between the first user and the second user.

7. The system of claim 1, wherein the request to fund the purchase is a request to at least partially fund the purchase.

8. A method of preauthorizing funding for a purchase via a mobile wallet system provided by a financial institution computing system of a financial institution, the method comprising:
    receiving, by a processor of the financial institution computing system from a first user device of a first user, auto-fund permissions relating to a preauthorization for the financial institution to fund certain purchases of a second user of the mobile wallet system without requiring approval of these certain purchases from the first user in response to a transaction initiated by the second user being denied by the financial institution, wherein the auto-fund permissions include an identity of a second user and transaction restrictions;

generating, by the processor, a payment code that includes a digital token corresponding to a mobile wallet account of the first user, the digital token comprising a scannable QR code and a geographic restriction defined by the first user such that the digital token is valid only in a particular merchant location;

receiving, by the processor, a request to fund the transaction at a merchant from an account associated with the first user based on a request for the transaction by the second user at the merchant, wherein the request is received from a point of sale system of the merchant, wherein the request to fund the transaction at the merchant is initiated without intervention by the first user or the second user based on the payment code sent to a device of the second user and transmitted to the point of sale system of the merchant;

transmitting, by the processor and to the first user device, a message including the request to fund the transaction;

determining, by the processor and in response to receiving an indication that the first user is viewing the message, a current location of a second user device;

determining, by the processor, that the transaction at the merchant is within the auto-fund permissions set forth in the transaction restrictions received from the first user by determining whether the current location of the second user device corresponds to the particular merchant location;

transmitting, by the processor, an approval message to the point of sale system of the merchant; and updating, by the processor, a database based on the received auto-fund permissions such that the first user appears as a payment source in a mobile wallet of the second user.

9. The method of claim 8, wherein the transaction restrictions include at least one of a transaction amount limit, a merchant limitation, or a previously approved transaction.

10. The method of claim 8, further comprising transmitting, by the processor, a user approval message to the first user device indicating approval of the transaction, wherein the user approval message includes an option to adjust the previously provided auto-fund permissions.

11. The method of claim 10, further comprising receiving, by the processor and from the first user device, updated auto-fund permissions in response to the user approval message.

12. A financial institution computing system associated with a financial institution, the system comprising:
a network interface configured to communicate with a plurality of user devices and a merchant point of sale system associated with a merchant via a network;
an account database storing information relating to a plurality of financial accounts maintained by the financial institution;
a memory; and
at least one processor coupled to the memory that stores computer-executable instructions that, when executed by the at least one processor, cause the at least one processor to:

receive, from a first user device of a first user, auto-fund permissions relating to a preauthorization for the financial institution to fund certain purchases of a second user of a mobile wallet system without requiring approval of these certain purchases from the first user in response to a transaction initiated by the second user being denied by the financial institution, wherein the auto-fund permissions include an identity of the second user and transaction restrictions;

receive a request to fund the transaction at the point of sale system of the merchant from an account associated with the first user based on a request for the transaction by the second user at the merchant, wherein the request to fund the transaction at the merchant is initiated without intervention by the first user or the second user;

in response to receiving the request, generate a digital token that corresponds to a mobile wallet account of the first user, wherein the digital token comprises a scannable QR code and includes a geographic restriction defined by the first user such that the digital token is valid only at a particular merchant location;

transmit, to the first user device associated with the first user, a message including the request to fund the transaction;

determine a current location of a second user device in response to receiving an indication that that the first user is viewing the message;

determine that the transaction at the merchant is within the auto-fund permissions set forth in the transaction restrictions received from the first user by determining whether the current location of the second user device corresponds to the particular merchant location;

transmit an approval message to the point of sale system; and update a database based on the received auto-fund permissions such that the first user appears as a payment source in a mobile wallet of the second user.

13. The system of claim 12, wherein the transaction restrictions include at least one of a transaction amount limit or a merchant limitation.

14. The system of claim 12, wherein the at least one processor coupled to the memory stores instructions that, when executed by the at least one processor, further cause the at least one processor to transmit a user approval message to the first user device indicating that the transaction was approved, wherein the user approval message includes an option to adjust the previously provided auto-fund permissions.

15. The system of claim 14, wherein the at least one processor coupled to the memory stores instructions that, when executed by the at least one processor, further cause the at least one processor to receive, from the first user device, updated auto-fund permissions in response to the user approval message.

\* \* \* \* \*